United States Patent [19]
Laing et al.

[11] 3,773,031
[45] Nov. 20, 1973

[54] DEVICE FOR STORING HEAT OR COLD

[76] Inventors: Nikolaus Laing; Ingeborg Laing, both of Hofenerweg 35-37, Aldingen B. Stuttgart, Germany

[22] Filed: July 9, 1971

[21] Appl. No.: 161,215

Related U.S. Application Data

[63] Continuation-in-part of Ser. No. 855,993, Sept. 8, 1969, abandoned.

[30] Foreign Application Priority Data
Sept. 9, 1968 Austria ............................... 8748/68

[52] U.S. Cl..................... 126/400, 62/396, 62/430, 165/104, 165/106, 219/314, 219/325, 219/365, 219/378
[51] Int. Cl............................................. F24h 7/02
[58] Field of Search..................... 165/10, 18, 104, 165/106; 62/430, 434, 393, 396; 219/302, 219/325, 326, 365, 378; 126/271, 400

[56] References Cited
UNITED STATES PATENTS
1,069,949    8/1913    Hassler ........................... 219/365 X
2,396,338    3/1946    Newton............................ 165/18 X
2,499,043    2/1950    Voorhees........................ 165/104 X
2,677,243    5/1954    Telkes .............................. 165/18 X
2,846,421    8/1958    Pollock........................... 165/104 X
3,356,828   12/1967    Furness.............................. 219/365

*Primary Examiner*—Albert W. Davis, Jr.
*Attorney*—Dean S. Edmonds et al.

[57]    ABSTRACT

A device for storing heat or cold having a tank containing a liquid which flows through the tank and a fusible heat storage material disposed in one or more containers, and a cooling or heating system which is subjected to heat exchange only with the liquid in the tank. The storage material containers form a system of ducts in the tank to provide a circulation of the liquid through the tank when heat is yielded to or received from the storage material.

4 Claims, 10 Drawing Figures

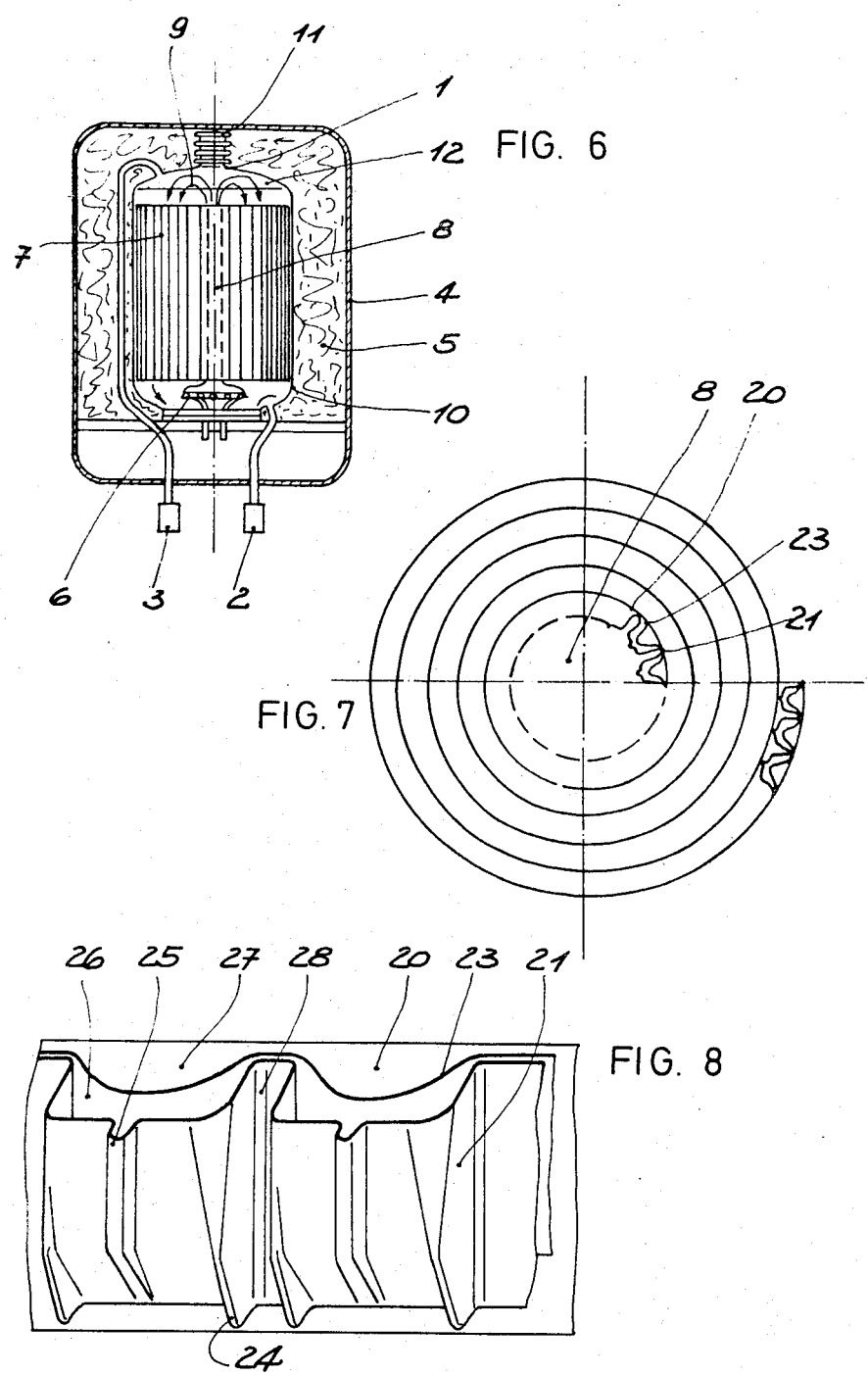

DEVICE FOR STORING HEAT OR COLD

CROSS REFERENCE TO A RELATED APPLICATION

This application is a continuation-in-part of our copending application Ser. No. 855,993, filed Sept. 8, 1969, now abandoned.

THE PRIOR ART

It is known to utilize power which can be obtained at cheap rates at certain times, e.g. overnight current, by equipping regrigerating machines or water heaters with storage materials which, on a change of their physical phase, absorb or yield up latent heat. In such known cases, the storage material which is within a container, is charged directly by a heating element, e.g. an electrical heater, or by a cooling element, e.g. a refrigerating tube, such as an evaporator in the form of a tube coil. If the latter is situated in a water-filled tank, ice is formed during the charging operation, i.e. on cooling, and deposits around the tube in the form of a solid accretion.

Since in the case of cold storage there is a danger of the container bursting owing to the increase in the volume of water on freezing, protective steps are required to limit the thickness of the layer of accreted ice surrounding the tube. The maximum tolerable layer of ice is in practice about 5 mm, while the wall thickness of a copper tube coil is about 1 mm. From this relationship it can be determined that the weight of the ice in such a cold storage device is roughly equivalent to the weight of copper of its piping. For this reason, there has hitherto been no widespread use of cold storage devices for cooling water or in air conditioning units. A similar system for the use of (e.g.) nitrate hydrates which melt at 80°C is known for heat storage for hot water production purposes. A copper coil is contained in a tank filled with the storage material and has water to be heated flowing through it. Analogously to the above-described cold storage device, a salt crust forms around the tube when water is withdrawn and finally occupies the entire interior of the container. On reheating by means of heating rods distributed uniformly throughout the material, there is a considerable increase in volume so that the container has to take extremely high forces. Thus the storage material in the known systems is charged directly by cooling or heating means and is discharged by contact with the medium which is to be cooled or heated. The disadvantage of this arrangement is to be obviated by the invention as is the difficulty that the storage materials in the solid phase are resistant to thermal conductivity between the cooling or heating source and the medium which is to be cooled or heated. A further disadvantage of prior art devices is that expensive control means have to be provided to protect the containers receiving the storage materials which have solidified.

SUMMARY OF THE INVENTION

The invention solves the various difficulties by the fact that the cooling or heating system is subjected to heat exchange only with the liquid which flows through the tank and which is required to be cooled or heated (which is called herein the service liquid), and the surfaces of the storage material containers form a system of ducts in the tank to provide a gravity circulation of the service liquid flowing through the storage containers when heat is yielded from or absorbed by the storage material in the container. Thus the cooling or heating register or means is not in direct heat exchange with the heat storage materials as in the prior art systems and instead the cooling or heating register is subjected to heat exchange only with the service liquid in the tank and said liquid is in turn in thermally conductive contact with the storage material disposed in the containers. The storage material in the tank and in thermally conductive contact with the liquid is thus utilized to increase the cooling or heating capacity of the storage device for a given volume.

In the application, reference will be made to "cold storage" and kindred wording, to mean the opposite of "heat storage" as the latter phrase is ordinarily used.

In the case of refrigerating units, an evaporative cooler can be disposed in the top part of the unit and in comparison with the above-described devices this evaporator is of relatively small size. The service liquid in the tank carries the heat of the storage material to the evaporator by gravity flow. In the case of a storage heater, a heating element is disposed in the bottom part of the unit, and the service liquid in the tank conveys the heat to the storage material by convection. The increase in volume of the storage material, which is advantageously packed as elements in plastic sheeting, no longer imposes loadings on the structure of the tank but results only in an insignificant deformation of the individual storage material containers, which expand into the free volumes left between the elements of storage material.

As a result of this construction, the heat exchange surface between the storage material and the service liquid can be of any reasonably desired area so that there is only a small temperature difference between the storage elements and the service liquid which may be withdrawn. There is also always a liquid filled volume between the storage elements, so that if a quantity of the service liquid is suddenly withdrawn, the temperature of this liquid nearly coincides with that of the storage elements provided that the amount withdrawn does not exceed the amount of liquid stored in the tank, i.e. the volumetric rest capacity of the tank. This applies both to water coolers, from which a maximum of 1/5 litre only is normally suddenly withdrawn at any time for drinking purposes, and to water heaters, from which hot water is normally suddenly drawn only in amounts of a few litres, e.g. for cooking purposes or for dish washing. If the amounts withdrawn are greater, e.g. for baths, such larger amounts can be withdrawn, but they will have a much lower mean temperature.

Cold storage devices according to the invention can also be used in conjunction with air conditioning units which withdraw heat from and therefore cool the storage device overnight and thus when disposed by an open window, heat the air passing through the refrigeration system. Alternatively, such devices cool the room air during the daytime by "stored cold," i.e. without the refrigerating machine being switched on, this cooling effect being achieved by means of a heat exchanger through which the service liquid flows in acting as a heat conveyor.

DESCRIPTION OF THE DRAWINGS

FIG. 6 shows a heat storage water heater according to the invention in partial section;

FIG. 7 is a diagrammatic section through the heat storage element of the heater shown in FIG. 6;

FIG. 8 is an enlarged perspective view of an end of a portion of the heat storage element shown in FIG. 6;

Figure 1:
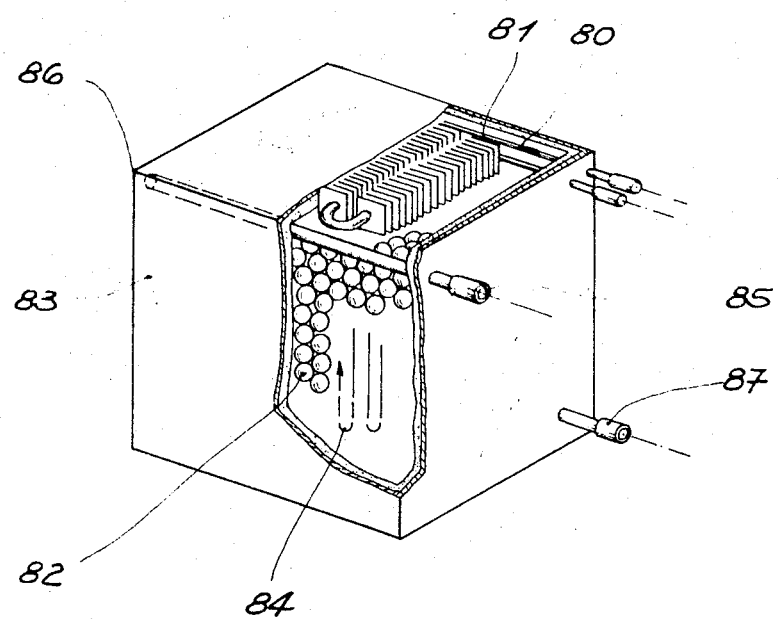
FIG. 1 illustrates a water cooler according to the invention in perspective, parts of the tank wall having been broken away.

The water cooler for the production of cold water as shown in FIG. 1 comprises an evaporative-type refrigerating machine (not shown), the evaporator 80 of which is disposed in a water tank 83. The evaporator 80 advantageously comprises heat exchanger fins 81, and is disposed above a filling 82 comprising storage elements in the form of containers filled with storage material. These containers may comprise two smooth deep-drawn part-spherical bowls which are welded or stuck together around their contiguous margins after the material has been introduced into the volumetric space between them. When the cooling system is switched on, the service water in the tank 83 filling the space between the storage elements 82 performs a convection flow in the direction of the arrows 84 and, having been cooled by the refrigerator system cools the storage elements 82. On discharge, i.e. when cold service water is withdrawn from the tank 83, tap water is fed through the pipe 85 to the corner 86 and then flows in a generally diagonal direction through the passages between the storage elements 82, and leaves via the spigot 87. The storage material in the storage elements withdraws heat from the water in these conditions, such heat being stored latently by the storage material which suffers phase change but which remains substantially at constant temperature. A feature of the embodiment illustrated is that the cooling system, i.e. the evaporator 81, does not cool the storage elements directly, and cooling thereof is effected by way of the service water contained in the tank 83.

Figures 2, 3:
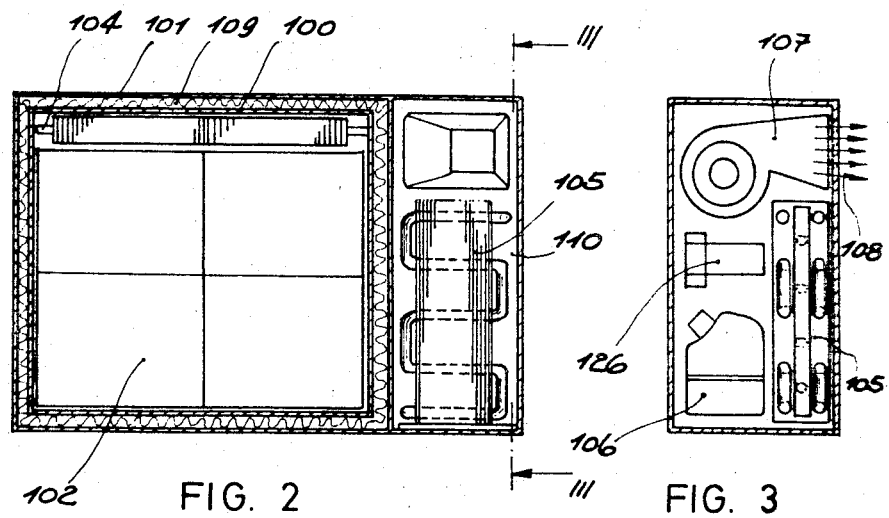
FIG. 2 illustrates an air conditioning unit according to the invention for operation with so-called off-peak mains supply.
FIG. 3 is a plan view of the air conditioning unit shown in FIG. 2.

FIG. 2 is a section of an air conditioning device charged by means of off-peak mains current. An air conditioning unit according to the invention not only utilizes off-peak current — which may be expected to be cheaper than daytime current — but also takes advantage of the fact that the temperature of the atmospheric air cooling the condenser may be expected to be lower during the night-time than during the daytime. The thermodynamic efficiency of the refrigerating circuit is thus improved. The unit comprises a tank 100, insulation 109 surrounding the latter, and an outer casing 101. Vertical heat storage plates 102 are disposed at small distances from one another inside the tank 100 so that the liquid in the tank, e.g. methanol or carbon tetrachloride, can circulate freely in contact with a large heat exchange area. At the top of the tank is a zigzag tube 104, preferably a finned tube.

Figure 4:
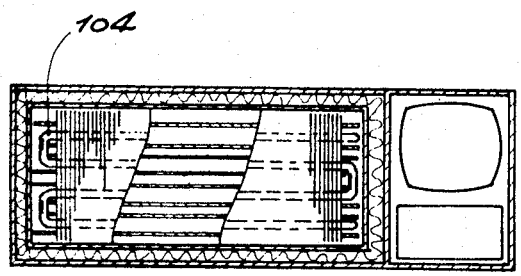
FIG. 4 is a side elevation of the air conditioning unit shown in FIG. 2.

As will be apparent from FIG. 4, the limbs 104A of the tube 104 lie over alternate intervals between two adjacent plates 102 so that each of the limbs 104A is disposed above a vertical flat-sectional duct formed by two adjacent plates 102. The methanol or other liquid cooled by heat exchange with the tube 104 drops down through such ducts and rises again in the alternate gap between two plates 102 above which there is no limb 104A, the liquid therefrom withdraws heat from the cold storage plate elements 102. Methanol is very suitable for this purpose, since the coefficient of expansion is many times the coefficient of expansion of water (enhancing the natural convection effect) and the freezing temperature is very low. During the off-peak or nighttime, heat is withdrawn first from the storage plates, and then from the methanol by the refrigeration effect in the tube 104. Then, at a higher temperature, heat is yielded to atmosphere by the condenser 105.

The condenser 105 and the compressor 106 forming elements of the refrigerating machine, are situated (together with a fan 107) in an end part 110 of the casing 101. During charging (which in this case means cooling down), the fan 107 draws air in the direction of the arrows 108 and thus withdraws heat from the condenser 105.

Figure 5:
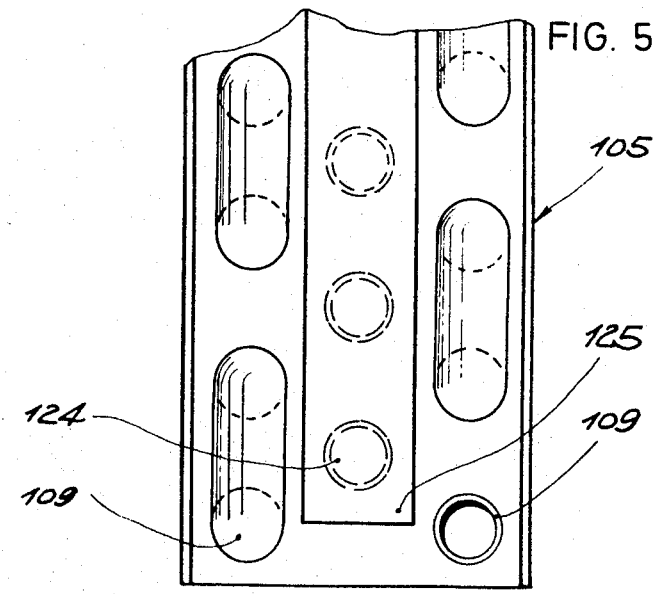
FIG. 5 is a partial plan view on larger scale, of the heat exchanger of the unit shown in FIG. 2.

The heat exchanger of the condenser 105, of which FIG. 5 shows a partial end elevation, comprises a plurality of superposed groups of tubes. The outer groups 109 carry the refrigerant, while the inner group 124 leads at the ends of the unit into distributors 125 connected to a pump 126. The attempt is again made to obtain a physically diagonal flow through the heat exchanger 105. During daytime operation, methanol is pumped out of the deepest point of the tank 100 and is forced via a distributor 125 and the tubes 124 to the second distributor on the other side, from which it is conveyed to the highest point of the tank. In this way, the unit can yield up during the daytime the cold that was stored during the nighttime.

Carbon tetrachloride is very suitable particularly in the case of use of storage substances of substantially identical density, so that the storage material containers 102 can have a very thin wall thickness having virtually neutral buoyancy. The storate material proposed to be used according to the invention is a hydrate having a freezing point of only −3° C or even +5° C, since in that case there cannot be any icing up at the heat exchanger 105. If the storage materials used freeze at even lower temperatures, then according to the invention some of the liquid leaving the heat exchanger 105 is returned to the inlet to the heat exchanger 105, i.e. the distributor 125, the ratio of this branch flow and the flow through the tank 100 being such that the temperature of the heat exchanger 105 remains above freezing point in the case of air throughput, so that the heat exchanger cannot ice up. According to the invention, water may also be used as heat storage medium, with phase-change to ice.

FIG. 6 shows a water heater according to the invention comprising a tank 1, an inlet pipe 2, an outlet pipe 3, an outer casing 4 and insulation 5. The tank 1 contains an electrical heater 6 and a spirally wound heat storage element 7 which is seen in plan view in FIG. 7. During charging, hot water flows upwards through the duct or passage 8 left in the centre and is distributed along the arrows 9 in the top region of the tank (FIG. 6). From here the water drops down again through the interslices of the element 7 and yields its heat to the storage element. The circulation flow is maintained until the storage material has been charged, i.e. has become molten. A temperature switch (not shown) is disposed in the zone 10, because it is at this point that the final temperature is reached. When the temperature reached at this point 10 is conveniently above the phase-change (melting) temperature of the storage material, heating is automatically switched off.

As shown in FIG. 7, the storage element comprises a noncorrugated metal strip 20 and a corrugated metal strip 21, and, if required, an intermediate metal strip 23 used to improve the heat distribution. As shown in FIG. 8 at reference 24, the corrugated metal strips 21, 23, are so folded at the ends of the corrugations that the development in each cross-section perpendicular to the axis of the container is equal. This construction of the ends avoids need for special caps at the ends to close the ducts or passages formed by the corrugations of the strips 21. The fold 25 ensures a specific spacing from the adjacent spiral turn of the metal strip 20. This construction may be used either in panels, i.e. in consecutive sandwiched layers, or be spirally coiled as in the example illustrated. Between the metal strips 20 and 21 filled with the storage material, there is disposed a thermally conductive plate 23 which is disposed so that the depth of penetration into the material is equal throughout in order that the material can be uniformly thermally discharged. According to the invention, the outer walls 20 and 21 preferably consist of non-metallic material. The selection of the distance 28 and the height of the fold 25 determine the dimensions of the ducts or passages left for the liquid which is to be heated, i.e. water in this case.

A storage element constructed as a spiral insert 7 can be made with very thin wall thicknesses and therefore compensate for small variations in density of the storage material, while the walls of the strips 21 can be slightly deformed. As a result, a small quantity of water is forced back into the pipe in the unit or displaced from the tank by a by-pass pipe at another point. In the case of hot water containers in which hot water must not be returned to the pipe, a member 11 in the form of a bellows is provided, as shown in FIG. 1, and absorbs the change of volume due to the variation in density of the storage materials.

Figure 9:
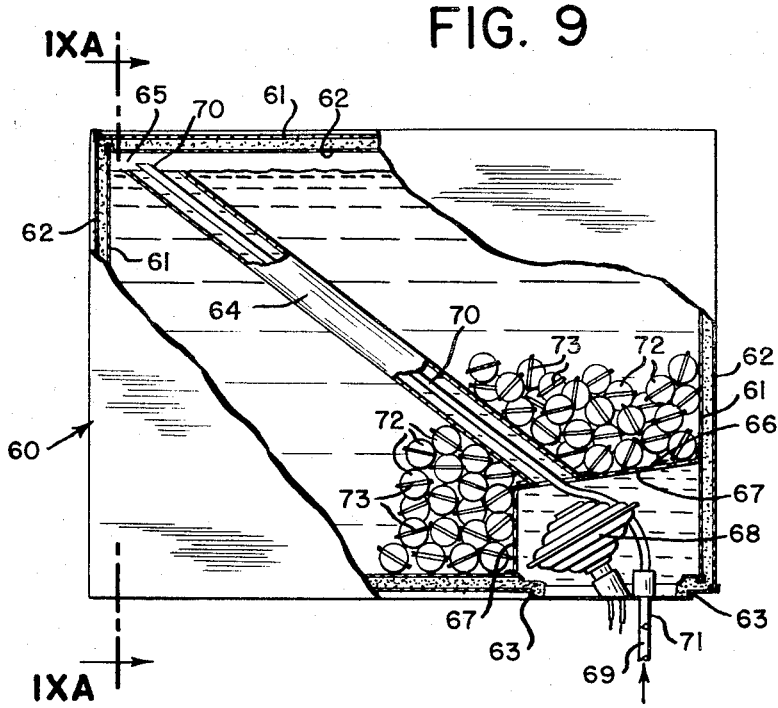
FIG. 9 is a sectional view of a water heater according to the invention.

FIG. 9 illustrates a water heater constructed according to the invention having an insulated tank 60 formed by space walls 61 and 62 which are joined together by a flange 63. The space between the two walls is filled with an insulating powder and any air remaining in the space is evacuated to form a highly compact and efficient thermal insulation barrier. By this construction, the total over-all dimensions of the water heater may be reduced since the wall thickness of the heater is on the order of six to eight times thinner than walls with a conventional foam insulation.

A hollow tube 64 extends from an upper corner 65 of the tank towards a diagonally opposite corner to a compartment 66 formed by perforated dividing walls 67. A heat source in the form of an electric resistance element 68 is included in this compartment.

A service water inlet fitting 69 opens into compartment 66 and provides a means for filling the tank with service water. The tube 64 has a further tube 70 therein with an opening at its end through which heated service water in the tank may be withdrawn by way of an outlet fitting 71.

The heat storage material used in the tank has high enthalpy characteristics, an example of such material being barium hydroxide octahydrate. The material is packaged in ball shaped containers 72 made up of hemispherical shells joined along a flange 73. The shells preferably are made of a resistant material, such as stainless steel.

In operation, cold service water enters the compartment 66 through inlet 69 where it is heated by the electric resistance element. The perforated walls serve to prevent contact of the element with the balls containing the heat storage material. The heated water then will rise by convection through the spaces between the balls, which spaces form convection ducts to the top portion of the tank where it then may be removed by the tube 70.

Figure 9A:
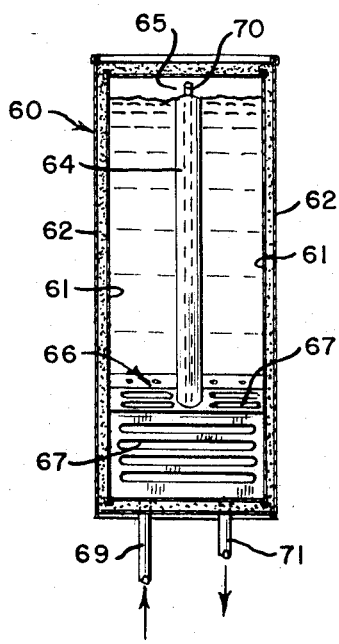
FIG. 9A is a view of the water heater of FIG. 9 taken along lines IXA — IXA.

A water heater following the construction of that shown in FIGS. 9 and 9A is considerably smaller than conventional prior art heaters and may be only 25 percent of the size of such conventional heaters.

We claim:

1. A heat storage device comprising a tank having an outer wall and an inner wall spaced from said outer wall and sealed with respect thereto to form a hermetically sealed chamber free from air between said inner and outer walls, an insulating powder filling said chamber, perforated walls joining the inner wall at a bottom portion of said tank to form a compartment, a heater means in said compartment, a service liquid inlet fitting connecting the interior of the compartment with a source of service liquid, an outer circulation tube extending from the interior of the compartment upwardly and diagonally with respect to said tank to the upper part of said tank diagonally opposite said compartment, an inner tube within said outer tube connecting the interior of the top portion of said tank to an outlet fitting by which service liquid may be withdrawn from said tank, and a plurality of heat storage packages having a heat storage material of high enthalpy characteristics packaged therein where said packages are positioned in said tank and exteriorly of said compartment whereby service liquid heated by said heater means may circulate upwardly through said tank and through spaces between adjacent heat storage packages.

2. A heat storage device according to claim 1 wherein said heat storage material is barium hydroxide octahydrate.

3. A heat storage device according to claim 1 wherein said packages are stainless steel ball shaped containers.

4. A heat storage device comprising a tank having an outer wall and an inner wall spaced from said outer wall and sealed with respect thereto to form a hermetically sealed chanber free from air between said inner and outer walls, an insulating powder filling said chamber, perforated walls joining the inner wall at the bottom portion of said tank to form a compartment in the tank, a heater means in said compartment, a service liquid inlet fitting connecting the interior of the compartment with a source of service liquid, means connecting the interior of the top portion of said tank to an outlet fitting by which service liquid may be withdrawn from said tank, and a plurality of heat storage packages each having a heat storage material of high enthalpy characteristics packaged therein where said packages are positioned in said tank externally of said compartment and separated from said heating means by said perforated walls whereby service liquid heated by said heater means may circulate upwardly through said tank and through spaces adjacent said heat storage packages to transfer heat from said heating means to each said package.

* * * * *